No. 874,723. PATENTED DEC. 24, 1907.
A. C. ANDERSON.
ADJUSTABLE VEHICLE SEAT.
APPLICATION FILED MAY 23, 1907.

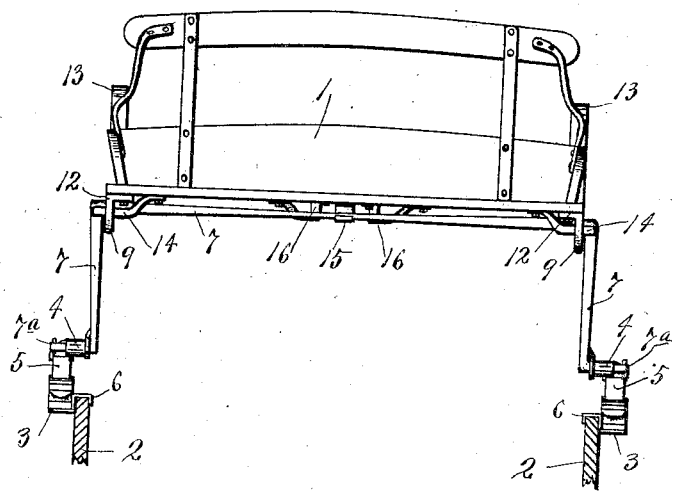

4 SHEETS—SHEET 2.

Witnesses
H. L. Dittbrenner
A. H. Opsahl

Inventor
Alfred C. Anderson
by his Attorneys
Williamson Merchant

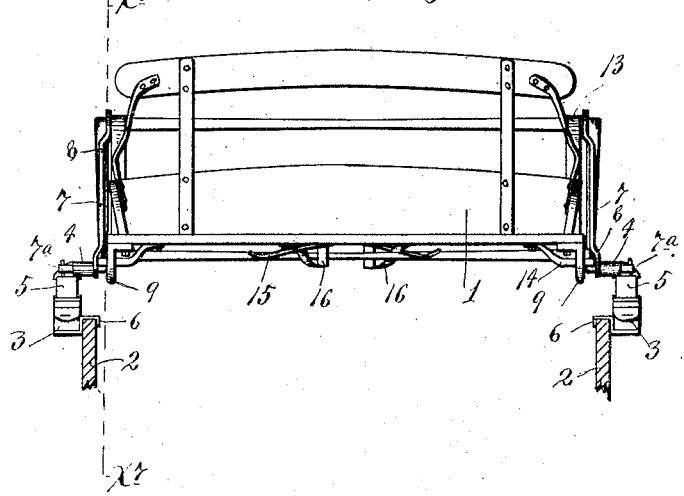

No. 874,723. PATENTED DEC. 24, 1907.
A. C. ANDERSON.
ADJUSTABLE VEHICLE SEAT.
APPLICATION FILED MAY 23, 1907.
4 SHEETS—SHEET 4.
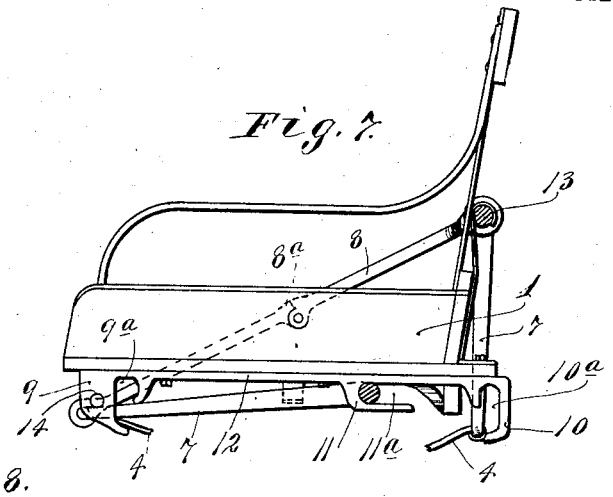
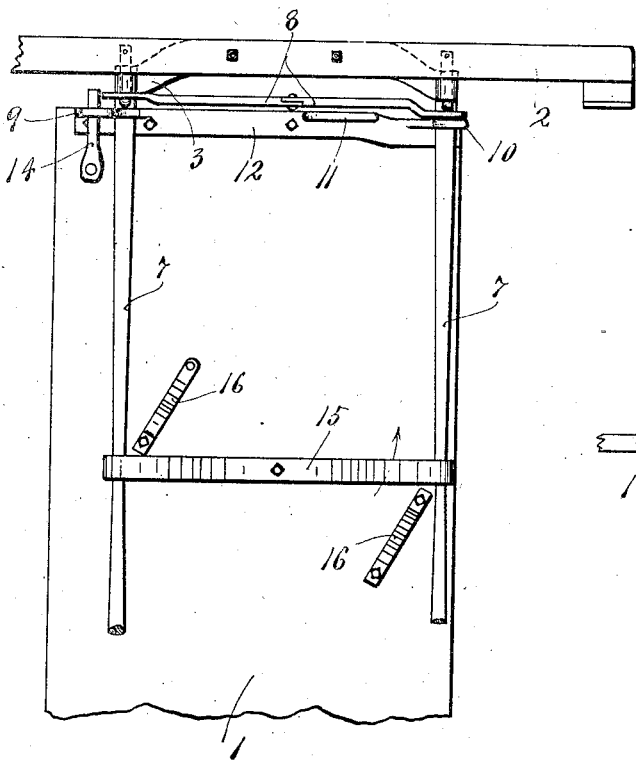
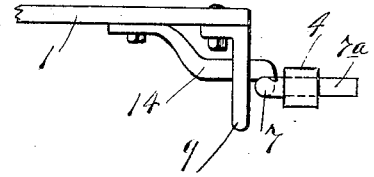
Witnesses
H. L. Dittbrenner
A. H. Opsahl
Inventor
Alfred C. Anderson
by his Attorneys
Williamson Merchant

UNITED STATES PATENT OFFICE.

ALFRED C. ANDERSON, OF ATWATER, MINNESOTA.

ADJUSTABLE VEHICLE-SEAT.

No. 874,723.　　　　Specification of Letters Patent.　　　　Patented Dec. 24, 1907.

Application filed May 23, 1907. Serial No. 375,215.

*To all whom it may concern:*

Be it known that I, ALFRED C. ANDERSON, a citizen of the United States, residing at Atwater, in the county of Kandiyohi and State of Minnesota, have invented certain new and useful Improvements in Adjustable Vehicle-Seats; and I do hereby declare the following to be a full, clear, and exact description of the invention, such as will enable others skilled in the art to which it appertains to make and use the same.

My invention has for its object to provide an improved support for vehicle seats, whereby the seat may be adjusted and held in different vertical positions or at different elevations with respect to the vehicle box or body, and to this end it consists of the novel devices and combinations of devices hereinafter described and defined in the claims.

The present invention is in the nature of an improvement on the device set forth and broadly claimed in my pending application S. N. 330,177, filed August 11, 1906, and entitled "Vehicle seats" In the present application, as well as in my prior application, the so-called "seat bottom" or seat proper is supported by a pair of crank rods capable of parallel swinging movements or adjustments to support the seat in extreme upper and lower positions, and the said cranks are capable of independent or differential pivotal movements for coöperation with crank engaging lock devices, to support the seat in an intermediate position.

The present invention is directed chiefly to improved lock mechanism or means for securing the crank rods in their different adjustments, and consequently the seat, at different elevations.

The invention is illustrated in the accompanying drawings, wherein like characters indicate like parts throughout the several views.

Figure 4:
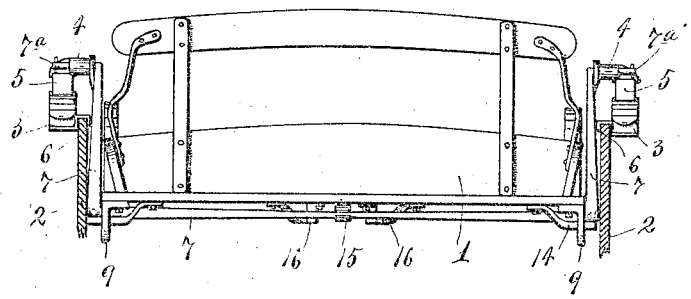
Figure 3:
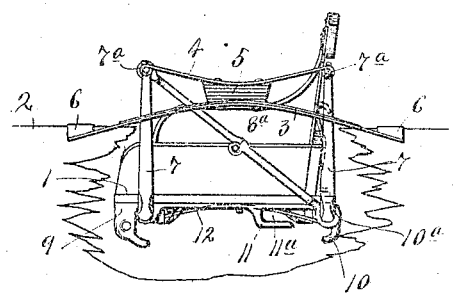

Referring to the drawings, Figure 1 is a view in side elevation, showing the improved seat support and seat, with the seat adjusted to its highest position. Fig. 2 is a front elevation of the said seat and support, adjusted as shown in Fig. 1. Fig. 3 is a view in side elevation, showing the seat support and seat, with the seat in its lowest position. Fig. 4 is a front elevation of the parts adjusted as shown in Fig. 3. Fig. 5 is a view in side elevation, showing the seat support and seat, with the said seat set in its intermediate position. Fig. 6 is a front elevation of the parts adjusted as shown in Fig. 5. Fig. 7 is a view partly in side elevation, but with some parts sectioned approximately on the line $x^7 x^7$ of Fig. 6, but with the parts shown on a larger scale than in Figs. 5 and 6. Fig. 8 is a bottom plan view, with parts broken away, showing the seat and adjustable support therefor; and Fig. 9 is a detail view in front elevation, showing a portion of the seat and seat supporting connections, some parts being broken away and some parts being removed.

The seat proper, which may be of any suitable form, is indicated as an entirety by the numeral 1, and the sides of the carriage or vehicle body from which the seat is supported are indicated by the numeral 2. As shown, the base members of the seat support are made up each of two leaf springs 3 and 4, the intermediate portions of which are connected by a spacing block 5, but it will be understood that so far as this invention is concerned, these base supports may take various forms and may be either resilient or rigid. In the arrangement illustrated, however, the lower springs 3 are provided with inwardly projecting rest hooks 6 that are adapted to engage with the upper edges of the sides 2 of the vehicle body.

The two crank rods 7 are provided at the ends of their arms with trunnions $7^a$ that are journaled in sleeves formed at the ends of the upper springs 4. The end portions of the transverse body of the rear crank rod 7 are connected to the trunnions $7^a$ of the front crank rod 7 by means of toggle links 8, which links are arranged to work close to the ends of the seat 1 and inward of the corresponding upper springs 4.

Secured to the ends and depending from the bottom of the seat 1 are front, rear and intermediate coupling brackets 9, 10, and 11, respectively, which as shown are formed integral with a tie strap 12. The front coupling brackets 9 are provided with seats $9^a$ that open downwardly and rearwardly, the rear coupling brackets 10 are provided with seats $10^a$ that open downwardly and forwardly, and the intermediate coupling brackets 11 are provided with seats $11^a$ that open toward the rear of the seat. The said seats $9^a$, $10^a$ and $11^a$ are adapted to receive the transverse body portions of the crank rods 7 in a manner which will presently be described.

The toggle links 8, it will be noted, are provided with coöperating stop shoulders 8ª at their intermediate joints which limit the downward movements of the toggles and serve to hold the same straight or approximately straight, as shown in Figs. 1, 3, 5 and 7. On the back of the seat, near the ends thereof, are coupling hooks 13 that are adapted to engage the transverse body portion of one of the crank rods 7 in a manner which will also presently appear. Secured to the bottom of the seat, at the ends and near the front thereof, are rest lugs or projections 14 (see particularly Figs. 7, 8 and 9), the purpose of which will also presently appear.

Intermediately pivoted to the bottom of the seat (see particularly Figs. 7 and 8) is a spring latch bar 15 and a pair of cam blocks 16. The ends of this latch bar 15 are adapted to engage the intermediate body portions of the crank rods 7 and hold the same engaged with the seats 9ª and 10ª of the coupling brackets 9, 10, and 11. The cam blocks 16 serve to raise the ends of the latch bar 15 into engagement with the respective crank rods when the said bar is oscillated in the direction of the arrow marked on Fig. 8.

The manner of manipulation of the seat support to support the seat at different heights is substantially as follows: In Figs. 1 and 2, the seat is adjusted into its highest position, and at this time the two cranks 7 are moved upward into vertical positions and the body portion of the rear crank rod 7 is located within the seats 10ª of the coupling brackets 10, while the body portion of the front crank rod 7 is located within the seats 9ª of the coupling brackets 9 and the two toggle links 8 which then occupy oblique positions, as best shown in Fig. 1, are pressed downward and straighten out so that they form a stiff brace that extend from the front lower corners to the upper rear corners of the approximately rectangular parallelograms formed by the ends of the seat, the upper springs 4 and depending arms of the crank rod 7 and thus rigidly hold the crank rods, and hence the seat, in elevated positions.

When the seat is adjusted to its lowest position shown in Figs. 3 and 4, the body portions of the crank rods 7 are turned downward and the arms thereof extend vertically upward to the ends of the springs 4; and in this adjustment the toggle links 8 form rigid braces between the upper forward corners and the rear lower corners of the approximate right angle parallelograms formed by the ends of the seat, the upper springs 4 and the connected arms of the said crank rods.

It will, of course, be understood that the toggle links 8 must be buckled or folded up in order to adjust the crank rods from the positions shown in Figs. 1 and 2 into the position shown in Figs. 3 and 4, or vice versa, and this, of course, may be easily done by pressing the intermediate portions of the said toggles upward. The said adjustments of the seat support and seat may, therefore, be very easily accomplished, and when the seat is moved into one or the other of its adjustments it will be very firmly held by the said toggle links or folding braces.

To adjust the seat to its intermediate position shown in Figs. 5 to 9 inclusive, the body portions of the crank rod 7 must be detached from the coupling brackets 9 and 10 (which, of course, requires a pivotal movement of the latch bar 15), the seat must be dropped down so that its rest hooks 13 engage the body portion of the up-turned rear crank rod 7, while the front crank rod is turned downward and rearward and engaged in the seats 11ª of the intermediate coupling brackets 11, as best shown in Fig. 7. When this is done, the rest lugs or projections 14 on the forward end portions of the seat bear upon the front end portions of the arms of the said forward crank rods 7 and thereby support the front portion of the seat. In this adjustment, the toggle links 8 hold the upper transverse portion of the rear crank rods 7 against oscillatory movements and thus the seat is securely held in its intermediate adjustment.

What I claim is:

1. The combination with a seat, of means for adjustably supporting the same, comprising a base support, a pair of crank rods, the bodies of which are connected to said seat with their arms arranged to clear the ends thereof, and with said arms connected to said base support by bearings located outside of said arms, and oblique links or braces connecting diagonally opposite portions of said crank rods and holding said crank rods in their set adjustments, substantially as described.

2. The combination with a seat, of means for adjustably supporting the same, comprising a base support, a pair of crank rods, the bodies of which are connected to said seat, with their arms arranged to clear the ends thereof, and with said arms connected to said base support by bearings located outside of said arms, and a pair of toggle-acting obliquely extended links connecting the end portions of said crank rods, substantially as described.

3. The combination with a seat, of means for adjustably supporting the same, comprising a base support, a pair of crank rods, the bodies of which are connected to said seat, with their arms arranged to clear the ends thereof, and with said arms connected to said base support by bearing located outside of said arms, and a pair of toggle links connecting the body portion of the rear crank rods to the lower end of the front crank rod, and adapted when straightened out to lock said crank rods against pivotal movements, in respect to each other, substantially as described.

4. The combination with a seat, of means for adjustably supporting the same, comprising a base support, a pair of crank rods, the body portions of which are detachably pivoted to said seat, and the arms of which are provided with trunnions pivotally mounted in said base support, toggle links connecting the body portion of the rear crank rod to the trunnions of said front crank rod, and rest lugs on the forward end portions of the seat engageable with the arms of said front crank rod when the seat is adjusted into an intermediate position, substantially as described.

5. The combination with a seat, of means for adjustably supporting the same, comprising a base support, a pair of crank rods, the arms of which are pivotally connected to said base support, and the body portions of which are detachably pivoted to said seat, of an oblique brace connecting the body portion of the rear crank rod to the arms of the front crank rod, and hooks or open brackets on the back and bottom of said seat engageable, respectively, with the body portions of the rear and front crank rods, substantially as described.

6. The combination with a seat, of means for adjustably supporting the same, comprising a base support, a pair of crank rods, the arms of which are pivotally connected to said base support, and the body portions of which are detachably pivoted to said seat, toggle links connecting the body portion of the rear crank rod to the arms of the front crank rod, rest hooks or open brackets on the back of said seat engageable with the body portion of said rear crank rod, and means whereby the front portion of the seat will be supported from said base support when the said rest hooks are engaged with said rear crank rod, substantially as described.

7. The combination with a seat, of means for adjustably supporting the same, comprising a base support, a pair of crank rods, the arms of which are pivotally connected to said base support, and the body portions of which are detachably pivoted to said seat, rest hooks or open brackets on the back and bottom of said seat engageable, respectively, with the body portions of said rear and front crank rods when the seat is adjusted into its intermediate position, toggle links connecting the body portion of the rear crank rod to the arms of said front crank rod, and rest lugs or projections engageable with the arms of the front crank rod when said seat is adjusted into an intermediate position, substantially as described.

8. The combination with a seat having open front and rear coupling brackets at its ends, of means for adjustably supporting said seat, comprising a base support, a pair of crank rods, the arms of which are pivotally connected to said base support, and the body portions of which are detachably engageable with the open coupling brackets of said seat, a latch bar pivoted to the bottom of said seat and engageable with the body portions of said crank rods to hold the same in engagement with said coupling brackets, and toggle links connecting the body portion of said rear crank rod to the arms of said front crank rod, substantially as described.

In testimony whereof I affix my signature in presence of two witnesses.

ALFRED C. ANDERSON.

Witnesses:
CARL M. SKAAR,
G. F. FISCHER.